(12) United States Patent
Yellamraju et al.

(10) Patent No.: US 8,626,499 B2
(45) Date of Patent: Jan. 7, 2014

(54) MULTIMEDIA SIGNAL LATENCY MANAGEMENT BY SKIPPING (75) Inventors: SivaKiran Venkata Yellamraju, Santa Clara, CA (US); Simha Sundeep Reddy Katasani, Santa Clara, CA (US)

(73) Assignee: ViVu, Inc., San Jose, CA (US)

( * ) Notice: Subject to any disclaimer, the term of this patent is extended or adjusted under 35 U.S.C. 154(b) by 633 days.

(21) Appl. No.: 12/840,293

(22) Filed: Jul. 20, 2010

(65) Prior Publication Data

US 2011/0022705 A1 Jan. 27, 2011

Related U.S. Application Data

(60) Provisional application No. 61/227,396, filed on Jul. 21, 2009.

(51) Int. Cl.
*G06F 13/00* (2006.01)

(52) U.S. Cl.
USPC .......................................................... 704/224

(58) Field of Classification Search
USPC .......................................................... 709/224
See application file for complete search history.

(56) References Cited

U.S. PATENT DOCUMENTS

| | | | | |
|---|---|---|---|---|
| 6,006,300 A * | 12/1999 | Toutant | ......................... | 710/314 |
| 6,012,110 A * | 1/2000 | Olson et al. | ...................... | 710/60 |
| 6,920,118 B2 * | 7/2005 | Lozano | ......................... | 370/329 |
| 7,982,739 B2 * | 7/2011 | Pasula | ........................... | 345/473 |
| 2002/0075831 A1* | 6/2002 | Lozano | ......................... | 370/335 |
| 2007/0087836 A1* | 4/2007 | Pasula | ............................. | 463/43 |

* cited by examiner

*Primary Examiner* — Robert B Harrell (74) *Attorney, Agent, or Firm* — Wong, Cabello, Lutsch, Rutherford & Brucculeri, L.L.P.

(57) ABSTRACT

A method or system for enabling client devices connected to a network to subscribe to a one or more multimedia signals available in a selection of bandwidths, based on an analysis of capabilities of the client, the quality of the connection, and the real-time changes in the ability of the client to process the signal.

23 Claims, 8 Drawing Sheets

Figure 1

Prior Art

| 502 NAME | 504 SPEED | 506 TYPE | 508 SOURCE |
|---|---|---|---|
| 510 VIDEO ONE | 512 584 KPS | 514 VIDEO | 516 SERVER |
| 518 CONF CHAT | 520 8 KPS | 522 TEXT | 524 CLIENT3 |
| 526 VIDEO ONE | 528 128 KPS | 530 VIDEO | 532 SERVER |
| 534 VIDEO TWO | 536 256 KPS | 538 VIDEO | 540 CLIENT 2 |

MULTIMEDIA SIGNAL LATENCY MANAGEMENT BY SKIPPING

CLAIM OF PRIORITY

This application claims the benefit of U.S. Provisional Patent Application No. 61/227,396 titled "Method and Apparatus for Subscription-based Bandwidth Balancing for Interactive Heterogeneous Clients'" filed Jul. 21, 2009.

BACKGROUND OF INVENTION

1. Field of the Invention

This invention relates to a method and apparatus for enabling interaction between users using two or more client devices with different capabilities and bandwidths.

2. Background and Description of the Related Art

In a heterogeneous network, different client devices have different capabilities. If a single stream is being viewed by these client devices, either the server must slow down to the rate of the slowest client or one or more clients will lose packets. Either way, the quality of the presentation will suffer.

Figure 1:
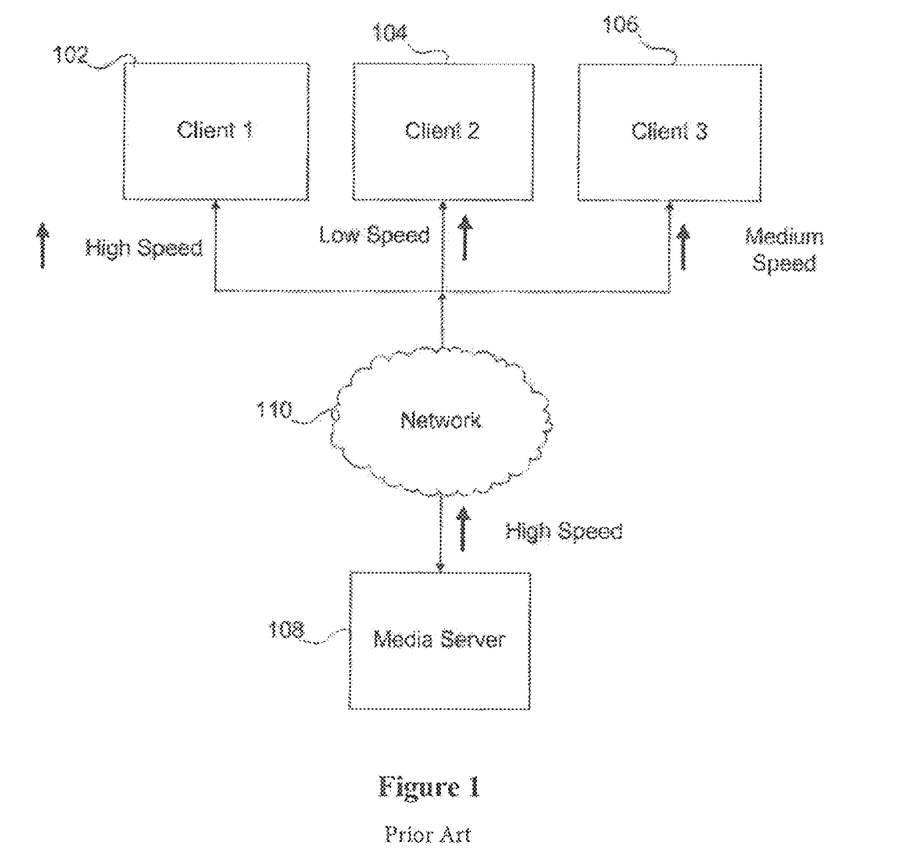
FIG. 1 illustrates the process of heterogeneous client-server interactions in the prior art.

FIG. 1 shows an example of such a system in the prior art. In this example, we show three clients. A client which can handle high speed data streams 102, a client which can handle medium speed data streams 106, and a client which can handle low speed data streams 104. In this scenario, a media server 108 sends a high speed data stream to the network 110. The media server has no knowledge of the clients 102, 104, 106 who are accepting the data stream, as they are passively integrated with the network 110 as well. The result will be that the client capable of keeping up with the stream 102 will be able to process it successfully. The other two 104, 106 will experience differing levels of degradation ranging from what appears to be noisy or distorted information being presented to the client to complete loss blocks of information.

SUMMARY

A method or system for enabling client devices connected to a network to subscribe to a one or more multimedia signals available in a selection of bandwidths, based on an analysis of capabilities of the client, the quality of the connection, and the real-time changes in the ability of the client to process the signal.

BRIEF DESCRIPTION OF THE DRAWINGS

A better understanding of the present invention can be obtained from the following detailed description in conjunction with the following drawings, in which.

The figures are provided in order to provide a thorough understanding of the present invention. The figures should not be construed as limiting the breath of the invention in any manner.

DETAILED DESCRIPTION

An embodiment of the device consists of a computer connected to a network and one or more interactive input devices. These input devices may include but are not limited to a mouse, keyboard and webcam. Each participant is assigned a role.

Figure 2:
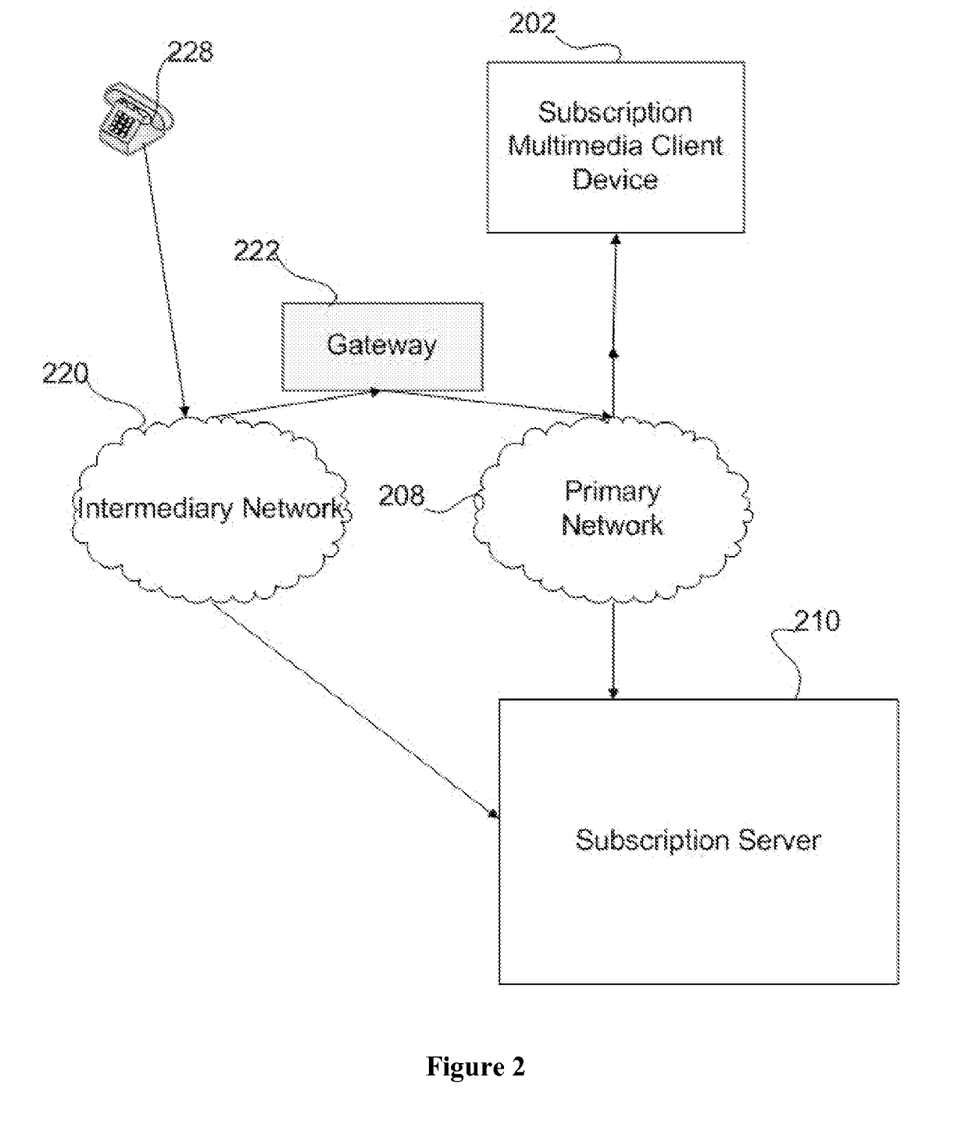
FIG. 2 illustrates the environment in which an embodiment of the subscription-based multimedia bandwidth balancing is executed.

FIG. 2 illustrates one environment in which one or more embodiments of the invention may operate. However, not all of these components may be required to practice the invention, and variations in the arrangement and type of the components may be made without departing from the spirit or scope of the invention.

As shown in FIG. 2, system includes subscription multimedia client devices 202, a primary network 208, and a subscription server 210. The primary network 208 is in communication with and enables communication between each of the subscription multimedia client devices 202 and subscription server 210. In one or more embodiments, one or client devices without subscription capabilities 228 may be connected via an intermediary network 220, such as a cellular or telephony network. The subscription server 210 may then interconnect with this intermediary network either indirectly via a gateway 222, or directly through its own interface 224.

Subscription multimedia client devices 202 may include virtually any network-capable device which can send and receive messages over a network 208, to and from another interactive device, such as the subscription server 210, each other, and the like. The set of such interactive devices may include devices that typically connect using a wired communications medium such as personal computers, multiprocessor systems, microprocessor-based or programmable consumer electronics, network PCs and the like. The set of such devices may also include devices that typically connect using a wireless communications network such as smart phones, integrated devices combining one or more of the preceding devices, or virtually any mobile device, and the like. Similarly, subscription multimedia client devices 202 may be any device that is capable of connecting using a wired or wireless communication medium such as a PDA, Pocket PC, wearable computer, and any other device that is equipped to communicate over a wired and/or wireless communication medium.

Each subscription multimedia client device 202 may include a browser application that is configured to receive and to send web pages, and the like. The browser application may be configured to receive and display graphics, text, multimedia, and the like, employing virtually any web-based language, including but not limited to a Standard Generalized Markup Language (SGML), such as Hyper Text Markup Language (HTML), a wireless application protocol (WAP), a Handheld Device Markup Language (HDML) such as Wireless Markup Language (WML), WMLScript, JavaScript, and the like.

Subscription multimedia client devices 202 may further include a client application that is configured to manage various actions on behalf of the subscription multimedia client device. For example, the client application may enable a user to interact with the browser application, email application, and the like.

The primary network 208 is configured to couple one interactive device to another interactive device to enable them to communicate. In one or more embodiments, the primary network 208 is configured to employ any form of computer readable media for communicating information from one electronic device to another. In one or more embodiments, the primary network 208 may include a wireless interface, and/or a wired interface, such as the Internet, in addition to local area networks (LANs), wide area networks (WANs), direct connections such as through a universal serial bus (USB) port, other forms of computer-readable media, or any combination thereof.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The term "modulated data signal" and "carrier-wave signal" includes a signal that has one or more of its characteristics set or changed in such a manner as to encode information, instructions, data, and the like, in the signal.

One embodiment of the subscription server 210 is described in more detail below in conjunction with FIG. 3. Briefly, however, the subscription server 210 may include any computing device capable of connecting to the primary network 208 to manage one or more interactions with two or more users through the subscription multimedia client devices 202. Devices that may operate as the subscription server 210 include personal computers, multiprocessor systems, servers, and the like.

The subscription server 210 may be configured to receive information associated either with a subscription multimedia client device 202, and to enable a user to customize a view based in part on the received information. The received information may include, but is not limited to capability information.

The term "capability information" is meant to encompass information about a client device and user to include information that is specific to how the user can interact with the subscription server 210 on a particular interaction session. For instance, if the user is dialed in or connected via a voice channel such as Skype™, then it would be voice only and no capabilities like graphics or chat would be available. However, if the user was connected via a personal computer with no microphone or camera, they would have graphical capabilities, could do chats, but could not subscribe to sound information.

The term "subscriber" is meant to encompass a user who is part of an interaction session but is not in control of the information being presented to other participants.

The term "publisher" is meant to encompass a user who is part of an interaction session and is in control of the information being presented to other participants.

The capability information may be stored in media that includes database, text, files and the like, that are configured to maintain and store information associated with the user and interaction session.

The "quality" of the media stream refers to the bandwidth of the stream. The higher the bandwidth, the higher the quality of the stream. A client device which has high available bandwidth can accommodate a higher quality media stream at a without losing or skipping parts of the signal. A client device with less available bandwidth will have to either subscribe to a lower quality stream or constantly skip ahead in using a signal buffer in order to keep up with the incoming signal.

In one or more embodiments, the subscription multimedia client device 202 would make itself known to the subscription server 210 by requesting to join a session. On request to join a session, the subscription server 210 sends the subscription multimedia client device 202 a list of all media streams associated with that session, including a unique identifier for the stream, the type of stream, and one or more bandwidths available for that stream. On request for some set of available media streams, the response from the subscription server 210 would be limited to those media streams in available bandwidths. In one or more embodiments, the subscription multimedia client device 202 includes display logic enabling a user to select the stream or streams desired. In one or more embodiments this can be limited to just the identifiers and then logic would be employed in the subscription multimedia client device 202 to maximize the number and quality of the streams. In other embodiments, the client may prioritize the streams such that the best quality of each stream is received or not received at all. In other embodiments, the client may select the actual bandwidth to associate with each stream.

In one or more embodiments, the subscription server 210 would include logic to limit this set to media streams which are applicable to a subscription multimedia client device 202. In one or more embodiments, where the subscription multimedia client device 202 logs in through some fixed interface such as Skype™ or even a non-interactive device such as a telephone or radio, the subscription server 210 would either detect or assume this fixed bandwidth and select the appropriate stream based on some information provided by the connection such as through an IVR, the phone number dialed into, and the like.

For each signal there is a publisher and subscriber. The subscription server 210 acts as a mediator between publishers and subscribers by storing the capabilities of all client devices. If the client devices have processing capabilities, they notify the subscription server 210 of their capabilities. If they do not, the subscription server 210 determines their capabilities based on the network (such as telephony) they are attached to.

Figure 3:
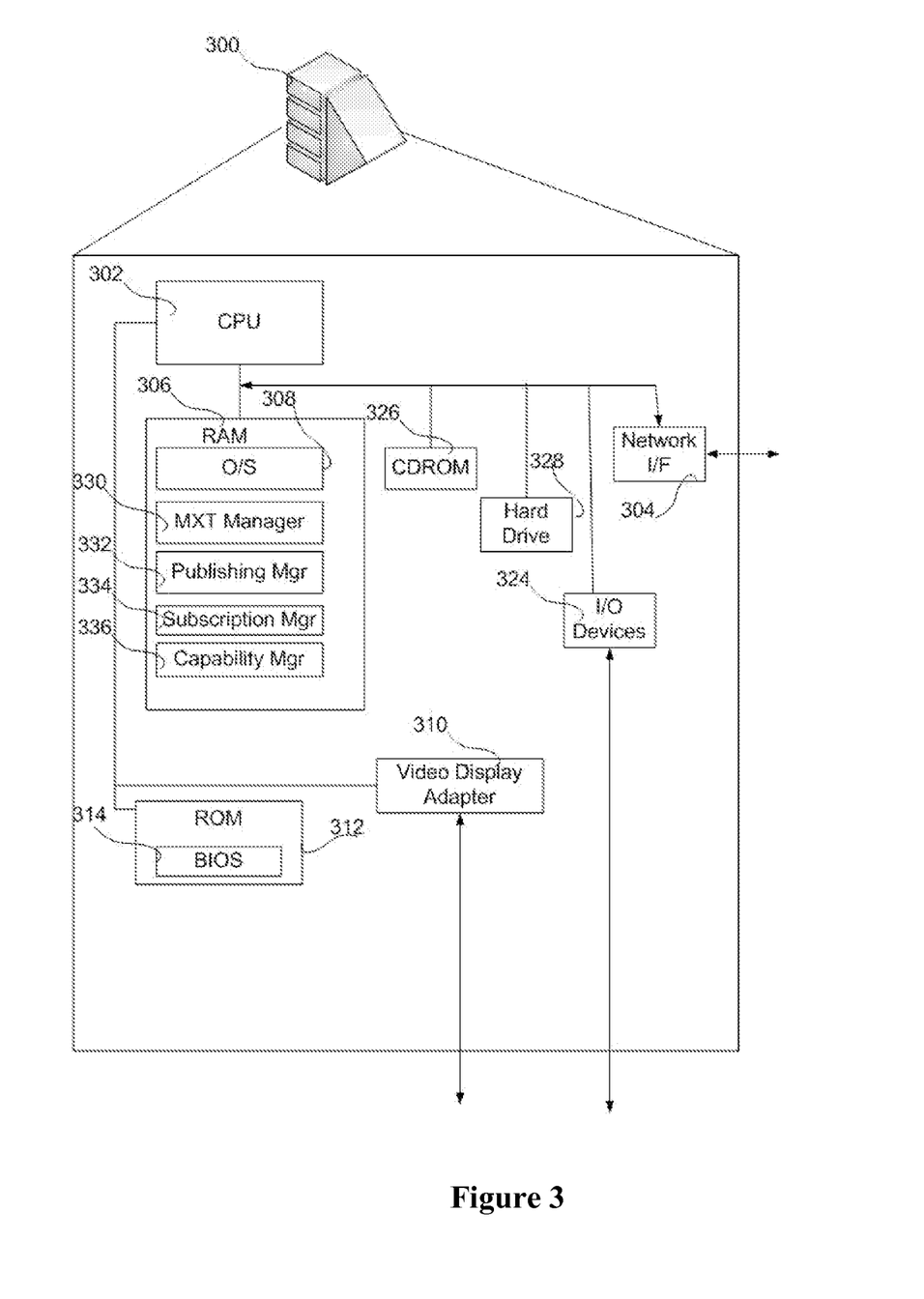
FIG. 3 illustrates one embodiment of a subscription server.

FIG. 3 shows one embodiment of the Subscription Server 300. Although illustrated in FIG. 3 in distinct components, the Media Exchange Table (MXT) Manager 330, Publishing Manager 332, Subscription Manager 334, and Capability Manager 336 may be arranged, combined, and the like, in any of a variety of ways, with other components embodied on the client, without departing from the scope of the present invention. For example, for some types of client devices that support storage or client program execution beyond render a graphic and sending interaction inputs (such as from a touch screen, keyboard or mouse) to a server, the software that is said to be embodied on the subscription server 300 may be on the client, and may be arranged as part of the component herein identified as the MXT Manager 330. In one or more embodiments, the information associated with each user and the logic to process the information would be stored on the client. Each client then would broadcast requests to all other clients listening on the network, such that each client would have its own embodiment of an MXT manager, publishing manager, capability manager, and subscription manager. In one or more embodiments, some clients such as simple telephone equipment or video monitors would not be capable of doing this, and so the logic would be needed on the server.

In one or more embodiments, the subscription server 300 includes input/output interfaces 324 for communicating with external devices, such as a mouse, keyboard, scanner, Network interfaces 304 for communicating over one or more networks, or other devices not shown in FIG. 3. In one or more embodiments, for the execution of the programs necessary for the subscription server to run, there is no need for direct human interaction on the server. However, the subscription server 300 may include one or more Video Display Adapters 310 to enable direct interaction with the server. The subscription server 300 may further include additional mass storage facilities such as a CD-ROM/DVD-ROM drive 326 or hard disk drive 328. Hard disk drive 328 may be utilized to store, among other things, application programs, databases, and the like. However, in other embodiments, the information may be stored on another form of persistence store such as a flash drive, read-only memory 312 (ROM), or network access storage (NAS) drives.

Computers generally run programs by stepping through a program or aggregate of programs called an operating system (O/S) 308. Parts of the O/S may run in random-access memory 306 and execute on a central processing unit (CPU) 302. In one or more embodiments, the RAM 306 is loaded at startup with parts of the O/S 308 and the ROM 312 contains the Basic Input/Output System (BIOS) 314. However, one or more embodiments a computer may include some or all of these components, such as a computer that runs only on software burned into ROM 312, using RAM 306 only for temporary data storage.

Figure 4:
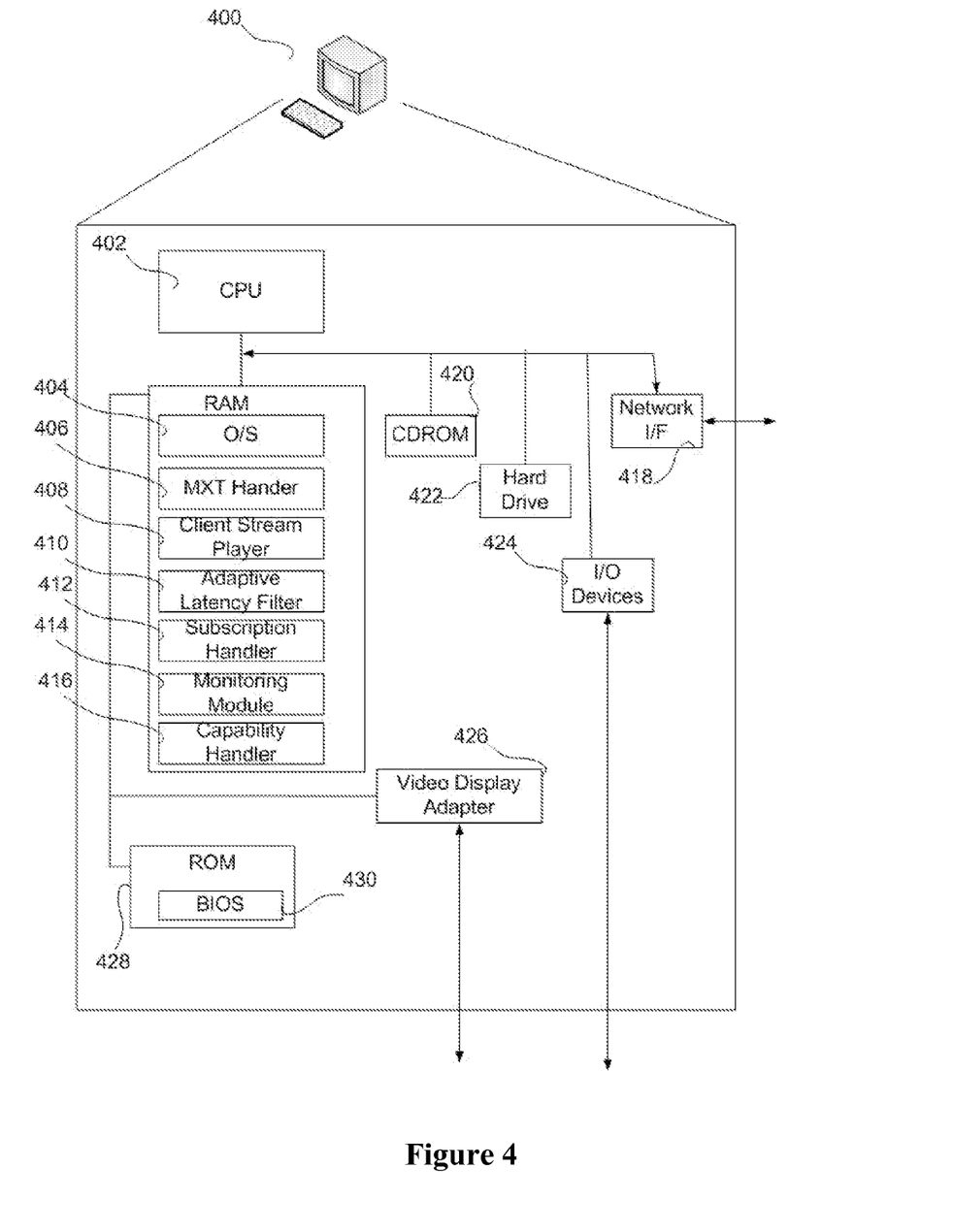
FIG. 4 illustrates one embodiment of a subscription multimedia client.

In one or more embodiments, each client's MXT Handler 406 would manage the relationship between the available media streams and the client stream players. Some clients such as telephones may not have compute capability. The MXT Manager 330 then maintains the subscriptions of all clients, unless the client is capable of doing its own processing and overrides it.

In one or more embodiments, the Publishing Manager 332 tracks the streams which are published from a client. The streams are published based on available bandwidth and priority. In one or more embodiments, the streams are published from the least bandwidth of each signal, in order of priority, then the next highest bandwidth of each signal in order of priority, until bandwidth is used up.

In one or more embodiments, the Subscription Manager 334 interacts with the MXT Manager 334 to request which streams to subscribe to based on the reported bandwidth and the available streams. When the client logs in, the MXT Manager 330 receives the set of media streams available and updates the MXT. The Subscription Manager 334 queries the MXT Manager 330 for streams and determines which streams to subscribe to based on priority of the signal type and the available bandwidth.

In one or more embodiments, the Capability Manager 336 manages the capabilities of all clients. If the clients have processing capabilities, they notify the server of their capabilities. If they do not, the server determines their capabilities based on the network (such as telephony) they are attached to. For those clients that don't have the ability to determine their own capabilities, the Capability Manager 336 interacts with the Subscription Manager 334 to send stream or streams to clients based on the capabilities of the client and bandwidth of the network. For example, if the client is part of a fixed network such as a telephony network, only a fixed rate audio stream would be available. If the client were on a local area network with a high available bandwidth, then multiple streams at different bit rates could be made available simultaneously. This includes the same information published at multiple bit rates.

In one or more embodiments, a client logs in to a session, determines its capabilities based on available hardware and bandwidth, then sends its capabilities to the server. However, if the client is not capable of processing, then the server will decide for itself based on the type of connection. A Capability Manager 336 exists on the server to be the aggregation of capabilities from all clients including the "dumb" clients.

The MXT Handler 204 manages the multimedia streams that the subscription multimedia client device 202 can subscribe to or publish based on available bandwidth. The CSP 206 manages the reception of the subscribed streams, including any quality issues associated with those streams. The ALF 226 manages the latency of the signal so that the buffer length is maintained such that the signal breaks are minimized to maintain the quality of the signal in balancing the bandwidth capacity of the client against the bandwidth requirements of the media streams. These components will be discussed in detail with FIG. 4.

FIG. 4 shows one embodiment of a Subscription Multimedia Client 400. Although illustrated in FIG. 4 in distinct components, the MXT Handler 406, Client Stream Player (CSP) 408, Adaptive Latency Filter (ALF) 410, Subscription Handler 412, Monitoring Module 414, and Capability Handler 416 may be arranged, combined, and the like, in any of a variety of ways, with other components embodied on the client or server, without departing from the scope of the present invention.

In one or more embodiments, the Subscription Multimedia Client device 400 includes input/output interface 424 for communicating with external devices, such as a mouse, keyboard, scanner, or other devices not shown in FIG. 4. However, in one or more embodiments, for the execution of the programs necessary for the Subscription Server to run, there is no need for direct human interaction on the server as the purpose of the server is to maintain sessions through presence requests and notification. Likewise, the Subscription Server may further include additional mass storage facilities such as a CD-ROM/DVD-ROM drive 420 or hard disk drive 422. Hard disk drive 422 may be utilized to store, among other things, application programs, databases and the like. However, in other embodiments, the information may be stored on another form of persistence store such as a flash drive, read-only memory (ROM), or network access storage (NAS) drives.

In one or more embodiments, Subscription Multimedia Client devices 400 may also send requests to the Subscription Server 300 that they are publishing one or more media streams. The Subscription Multimedia Client device 400 would calculate the total bandwidth of these streams such that the sum of the bandwidth used to publish streams does not exceed the total bandwidth available. The total bandwidth available is reduced by the media streams that the Subscription Multimedia Client device 400 has subscribed to.

In one or more embodiments, the Subscription Multimedia Client device 400 can adjust the quality of the streams subscribed to as the bandwidth available degrades or improves. If the Subscription Multimedia Client Device 400 detects a temporary degradation in bandwidth it can change subscriptions to streams to a lower bandwidth stream if available or drop a stream entirely. In one or more embodiments, the algorithm to do this could vary with the state of the client, so that it might be programmed to keep published streams dropping subscribed streams first, drop video keeping voice channels, or based on some user-selected priority scheme.

In one or more embodiments the MXT Handler 406 manages the relationship between the available media streams and the client stream players. The MXT Handler 406 tracks the total available bandwidth and signal quality. Both the available bandwidth and signal quality changes as a function of time. The ALF 410 determines that the signal quality has changed based on time series calculations around thresholds. If the ALF 410 determines that a threshold has been crossed indicating that the signal quality has decreased, it commands the CSP 408 playing that stream to downgrade. If a lower grade stream is available, the CSP 408 will downgrade the stream. If the signal quality has increased, the ALF 410 will command the CSP 408 to upgrade the stream if available. If more bandwidth is introduced because one or more streams are no longer associated with CSPs 408, the other CSPs 408 are commanded to upgrade based on the amount of bandwidth available and the priority of the signals. In one or more embodiments, the priority of each signal is determined based on an algorithm which ranks by media type and bandwidth.

The MXT Handler 406 will act on the signal parameters based on the MXT. The MXT is always the same for all clients logged into a specific session, covering all published streams in that session. When a device is logged into the server it will receive the MXT associated with that session based on what streams are available from the Publisher Manager on the particular Subscription Server they are connected to.

In one or more embodiments, the CSP 408 plays the media stream on behalf of the client. One or more CSPs 408 are created on a client, one for each media stream generated for the client. A media stream is associated with a Subscription Handler 412. In one or more embodiments, each Subscription Handler 412 maintains the state of a stream, It assigns the stream to a CSP 408. As the bandwidth or signal quality changes such that the signal is no longer available, the Subscription Handler 412 commands the CSP 408 to play a different media stream.

In one or more embodiments, there are one or more instantiations of the CSP 408 to play video, slides, audio, or other kinds of streams. Each CSP 408 connects to an instance of a Subscription Handler to obtain a stream. Once the CSP 408 starts playing, there could be glitches in the signal such as network drops which are accounted for by the buffering logic.

Each stream is associated with a monitoring module 414 that monitors the stream latency. The latency statistics from the monitoring module 414 are reported to the ALF 410 which calculates the rate of change of the latency (i.e. derivative) to adapt the stream by feeding back actions to the CSP 408 to skip ahead in the buffer, increase or decrease buffer sizes, and the like. The ALF 410 will command a CSP 408 with its actions; if a stream gets disconnected, that gives more bandwidth and other CSPs could then go "upscale" to get more bandwidth. If there is an improvement in the incoming signal quality, the ALF 410 will command the CSP 408 to reset and eliminate any delay.

The MXT Handler 406 maintains the state of the media. For example, if you playing a low quality stream so you are in a state called "LOW". If a high quality stream is published, the Subscription Handler 412 should command the CSP 408 to consult the MXT Handler 406 to see if there is enough bandwidth to use it. If the ALF 410 reports a lot of resets, then the ALF 410 will command the CSP 408 to downgrade, and so the CSP 408 will query the MXT Handler 406 to see if it can downgrade the signal. If no signal is available to downgrade to, the CSP 408 will stop playing the signal altogether until the quality improves. As soon as it downgrades, the MXT Handler 406 will update the state of the stream. The MXT Handler 406 will maintain the total bandwidth available, total bandwidth used, total bandwidth free, thus maintaining the state of a CSP 408 as being mapped to a stream at a specific quality.

In one or more embodiment client devices which support adequate processing have their own Capability Handler 416. The Capability Handler 416 figures out what the capabilities of the client are by reflecting bandwidth to the server as well as determining what hardware (webcam, CPU, RAM) are available on the client. Based on its' report to the Subscription Server 300, the Subscription Server determines the proper set of streams to send to the Subscription Multimedia Client device 400.

Figure 5:
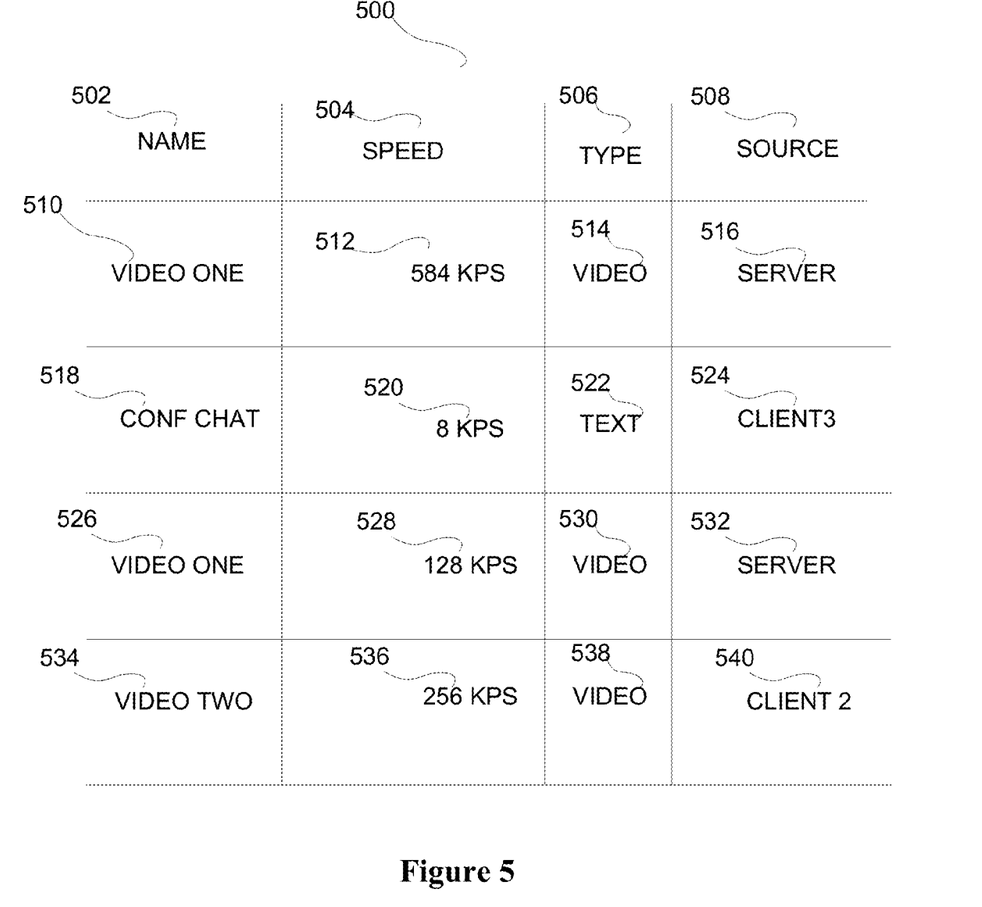
FIG. 5 illustrates one embodiment of the media exchange table.

FIG. 5 shows an embodiment of a data structure to store the information the MXT Handler needs, called the Media Exchange Table (MXT) 500. The MXT 500 is an embodiment of a list of the available media streams to publish and subscribe to. Logic in the client stream player would choose which streams to publish and subscribe to based on the available bandwidth and the priority algorithm programmed into it. The MXT 500 would store the identifier or name 502, speed 504, type 506, and source 508 for each available stream. The name 502 could be a human-readable descriptor or in another embodiment encoded information to include other parts of the information such as stream type or source. In one or more embodiments, the speed 504 is a number representing a measure of a bandwidth. In other embodiments the value for speed represents some arbitrary unit based on the units of that the bandwidth is stored in. The type field 506 provides some indication of how the media stream will be presented to the user. In one or more embodiments, there may only be one voice stream that can be played at a time. The source field 508 provides an indication of where the stream came from, so that the client device or server can inform that device whether or not it is available via messages to all devices that have subscribed.

In FIG. 5, the first entry in the table is for a signal named "VIDEO ONE" 510 with a speed of 584 KPS 512, type of "VIDEO" 514, and source of SERVER 516. Another signal with the same name 526, type 530, and source 532, but a different speed 528 is also available. That means that if this signal is one that the user is interested in, he can accept the higher bandwidth signal 512 unless required bandwidth is not available. If available bandwidth is insufficient, then go to the lower bandwidth signal 528, before having to reject it altogether. There is also a text signal 518-524 and a video signal 534-540 from other clients named CLIENT3 524 and CLIENT2 540 respectively. Depending on the algorithm used by the client device to select if it is bandwidth limited, one or more of the named signals may not be subscribed to.

In one or more embodiments, each subscription multimedia client device has a component called an Adaptive Latency Filter (ALF). The ALF measures the latency of each signal subscribed to over time. In one or more embodiments, this is done by buffering approximately the last 30 seconds of the signal. Although the 30 seconds is not a specific value that the processor must adhere to, if it is too long then the time between resets is very long and the signal may degrade significantly between resets. If it is too short, then the number of resets becomes large and the signal appears or sounds very choppy. In other embodiments, the value of the buffering time is adaptive based on the rate of resets over some period of time. In one or more embodiments, if you have a higher rate of resets (i.e. resets over some period of time like 60 seconds), the size of the signal buffer is increased. In one or more embodiments, the buffer size is parameterized with min and max limits. In one or more embodiments, the buffer sizes are increased or decreased in fixed steps. In other embodiments the buffer size is changed based on a size proportional to the reset rate. In other embodiments, if the reset rate over a period of time falls below some threshold associated with a minimum number of skips over a period of time, the CSP associated with the signal is commanded to upgrade the signal if available; if it goes above a threshold associated with a maximum number of skips over a period of time, the CSP associated with the signal is commanded to downgrade the signal if available.

The "norm" is a measure of a weighted average of the moving average of latency over some recent period of time. In one or more embodiments, the period of time is 30 seconds. The "norm" is used to determine the threshold for reset. In one or more embodiments the weighted average is based on the value of the moving average; the higher the value the lower the weight. The moving average is what you observe over the 30 second period. The "best norm" is the minimum norm measure over the session up to that point in time. We define thresholds relative to the absolute value of the norm and best norm. A threshold relative to the norm will be lower than threshold on best norm, for instance, the norm is 1 sec, best norm is 2 seconds. It could also be a fixed percentage above the value as well. If measured signal latency is above either of those by a threshold percentage period of time, then the CSP playing that media stream is commanded to skip part of the signal.

The ALF 410 calculates the average latency over some period of time. In one or more embodiments the calculation of average latency is done by calculating the derivative of the latency vs. time. In one or more embodiments, the ALF 410 maintains the minimum latency over the current session. If the moving average is greater than some preset value, part of the signal is skipped to allow the stream in the CSP 408 to catch up, but no more than a specified amount over a specified time period. This is done to minimize the effect of the signal going faster when it falls behind, but the amount you generally lose is a few tenths of a second of signal every few seconds so that the signal remains intelligible. A typical value for the amount of signal skipped would be about 0.5 second, which is more than enough for a user to notice, but not enough to seriously degrade the quality of the user experience.

Figure 6:
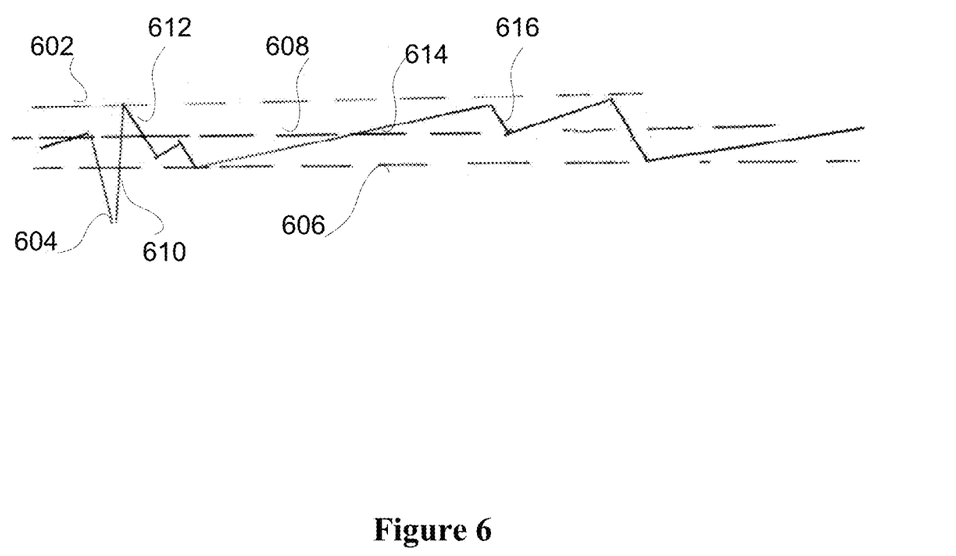
FIG. 6 illustrates how the system processes a data stream where the client is slower than the stream.

FIG. 6 shows an example of a graph of latency vs. time and how an embodiment of the ALF 410 might process it. In one or more embodiments, over some period of time since the start of the session, a mean value for the latency is calculated 608. Then a band around the mean value defined as a percentage of the mean value above 602 and below 606 is set. If the rate of increase of the latency is above some value for some configured period of time 610 then a small part of the signal is skipped to reduce the latency in two steps 612. The value of the percentage is not fixed, but 150% has been found empirically to be a good value to start with. If the band is much smaller, you risk continuous resets, reducing the quality of the signal. If the band is too wide, the signal will be allowed to drift significantly between resets, again significantly reducing the quality of the signal. In one or more embodiments, the percentage of the mean used to define the band is dynamic based on the number of resets over some period of time significantly longer than time to calculate the mean. The size of the part of the signal that is skipped is on the order of 0.5 seconds. It can be longer, but the longer it is the more the user experience is degraded. The shorter it is, the longer it will take for the stream to "catch up" and the more often it will have to skip part of the signal.

In one or more embodiments, the use of a derivative measurement may cause changes in the latency to be missed if the latency drifts slowly over a period of time. In such a case, the moving average algorithm would miss the drift but its' absolute value would be greater than some percentage of the minimum value, it also resets. As shown in FIG. 6, if the slope of the change in latency is low 614, if the latency exceeds some preset value 602 then parts of the signal will be skipped 616.

In one or more embodiments, there would be two moving averages, a short moving average is compared to a long moving average, and if the shorter moving average is greater than the substantially longer moving average, some fraction of a second of the signal is skipped. Then it repeats every some preset period until it catches up. In one embodiment, the short moving average would be 5 seconds and the long moving average would be 30 seconds. The period of the short moving average should be substantially longer than the reset period, but substantially shorter than the long moving average. If the period of the shorter moving average is too short, then the signal quality would be affected too much by momentary changes in the signal quality. If the period of the shorter moving average is too long, then you might not see a lot of the drift because it would drift right along with the longer moving average.

In one or more embodiments, we also can use a concept called dynamic aggression to avoid choppy signals. Dynamic aggression means that, if resetting occurs some number of times in a row over some period, then the size of the skip is increased by some percentage and the time between allowable skips is increased by some other percentage.

Figure 7:
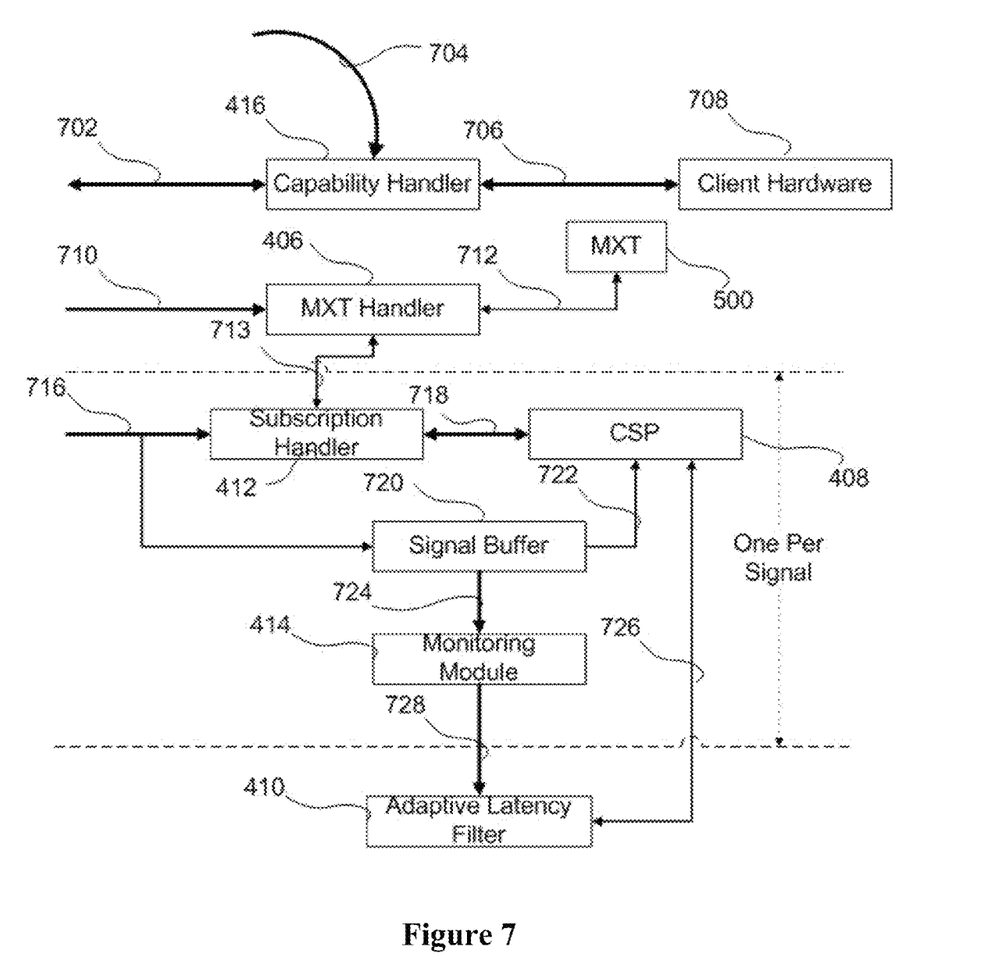
FIG. 7 illustrates a process associated with handling an incoming media stream.

FIG. 7 illustrates one embodiment of the process associated with handling an incoming media stream. When a user's login is accepted, the Subscription Server will send a message 704 to request capabilities of a client device. If the client device has a Capability Handler 416, it will query 706 the existing client hardware 708 to determine the capabilities of the user and the hardware. It will also send messages on the network 702 to determine the bandwidth it sees. It then responds 702 to the request from the Subscription Server with a set of capabilities that the server will use to determine what media streams should be made available to this client. The Subscription Server will use this information to send the information 710 on the available media streams to the MXT Handler, which will then use this to initialize its Media Exchange Table 500. Once the Media Exchange Table 500 is established, the MXT Handler 406 can create a Subscription Handler 412, Signal Buffer 720, and CSP 408 for each media stream to be processed. The Subscription Handler 412 will monitor the incoming media stream to determine the general quality of the stream, and report it to the MXT Handler 713. If the quality of the incoming stream falls below a threshold where the signal is no longer of reasonable quality, the CSP is commanded 718 to stop playing the stream. The signal enters a signal buffer 720 and is played into the CSP 722 with some measurable latency. This latency is measured by the monitoring module 414. The measured latency is reported to the ALF 410 which calculates the quality of the signal processing based on the derivative of the latency. As the quality of the signal processing changes, the ALF 410 will command 725 the Signal Buffer 720 associated with the media stream to grow and shrink, and command 726 the CSP 408 associated with the media stream to skip ahead or reset its position in the signal buffer 720.

Figure 8:
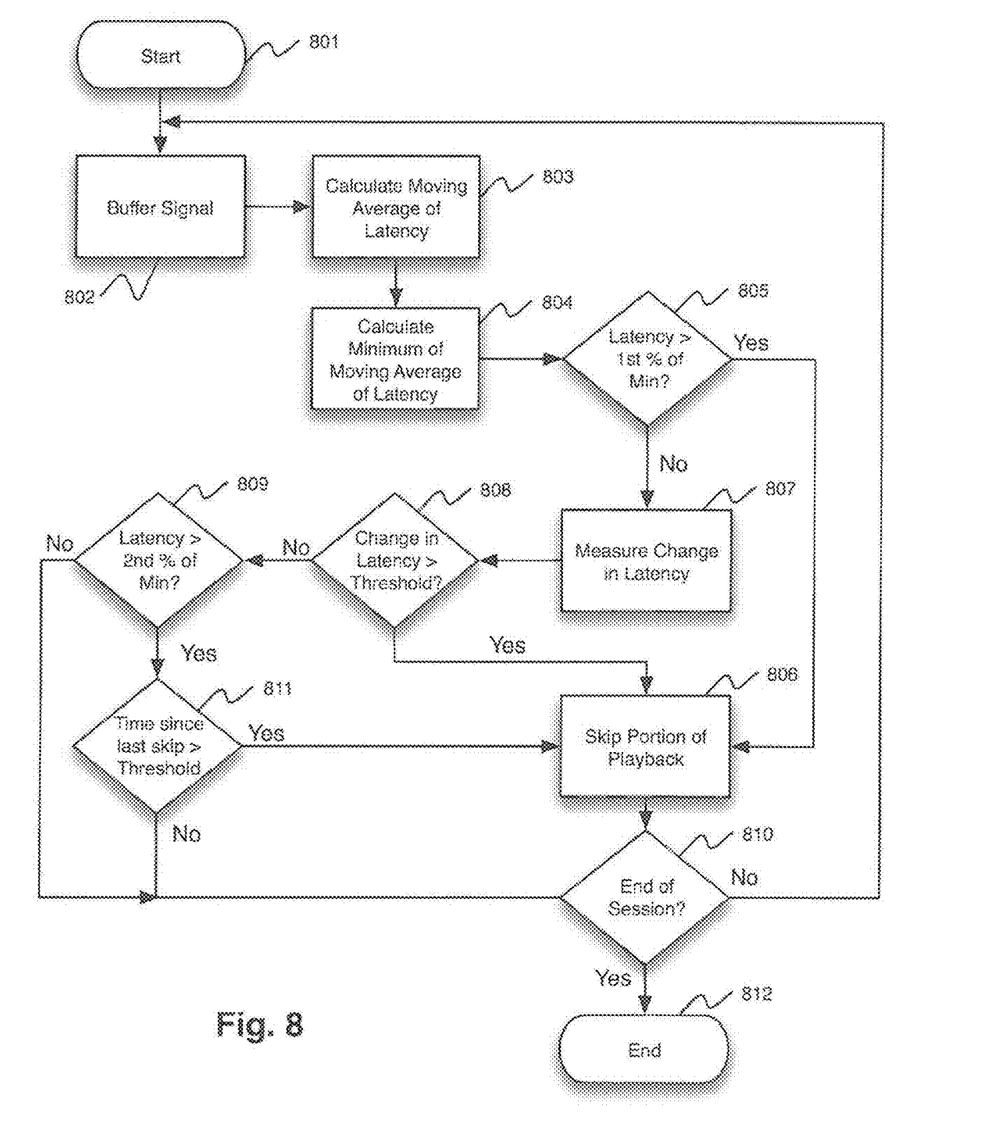
FIG. 8 illustrates a method of managing the impact of signal latency on the reception of a multimedia signal by a client device coupled to a network.

FIG. 8 illustrates a flow chart of a method executed by client device 400 for managing the impact of signal latency on the reception of a multimedia device. The method starts at block 801 and includes buffering a part of the signal 802. At 803, a moving average of latency over a first period of time is calculated. Additionally, at 804, a minimum of the moving average of the latency over a session is calculated. If this latency exceeds a first percentage of the calculated minimum (block 805) then a portion of the playback is skipped (block 806). After this skipping, it is determined whether it is the end of the session (block 810). If so, the process ends (block 812). Otherwise, the process returns to block 802.

Otherwise, if it was determined at block 805 that the latency was not greater than a first percentage of the minimum of the moving average of the latency, a change in latency is measured at block 807. If, at block 808, this change in latency is greater than a threshold (a/k/a configured value) then a portion of the playback is skipped (block 806). As above, it is then determined whether the session has ended (block 810), and, if so, the process ends (block 812). Otherwise the process returns to block 802.

Otherwise, if it is determined at block 808 that the change in latency does not exceed the threshold, it is determined whether the latency is greater than a second percentage of the calculated minimum (block 809). If not, it is determined whether it is the end of the session (block 810) and, if so, the process ends at block 812 or, if not, the process returns to block 802. If it is determined at block 809 that the latency does exceed the second percentage of the calculated minimum of the moving average of the latency, then, at block 811, it is determined whether the time since a portion of playback was last skipped is greater than a threshold. If so, then a portion of the playback is skipped (block 806). Otherwise, of after this skipping, it is determined whether the session has ended (block 810), and process proceeds accordingly either to the end (block 812) or back to block 802.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What is claimed is:

1. A method executing on hardware of a client device coupled to a network for managing the impact of signal latency on the reception of a multimedia signal by the client device, the method comprising:
   calculating, on the client device, a first moving average of the signal latency over a first period of time;
   calculating, on the client device, a minimum of a first moving average of the latency over a session;
   measuring, on the client device, a change in signal latency over some configured period of time;
   buffering, on the client device, a part of the signal having a length corresponding to a selected period of time prior to presenting it;
   skipping playback, on the client device, of a defined period of time of the signal if the change in signal latency exceeds some configured value;

skipping playback, on the client device, of the defined period of time of the signal if the signal latency exceeds a first configured percentage of the measurement of the minimum of the first moving average; and skipping playback, on the client device, of the defined period of time of the signal if the signal latency exceeds a second configured percentage of the first moving average of the signal latency a third configured period of time after the last time a part of the signal was skipped.

2. The method in claim 1, where the defined period of time for which playback is skipped is smaller than the buffer length.

3. The method in claim 2, where the defined period of time for which playback is skipped is less than 0.5 seconds.

4. The method in claim 1, where the first period of time over which the first moving average of the signal latency is calculated is shorter than the size of the buffer but longer than the second configured period of time.

5. The method in claim 4, where the first period of time over which the first moving average of the signal latency is calculated is at least 3 seconds but not more than 10 seconds, and the second period of time is at least 30 seconds but not more than 2 minutes.

6. The method in claim 1, where method further comprises:
calculating, on the client device, a second moving average over a second period of time, wherein the second period of time is longer than the first period of time; shorter than the expected length of a session; and skipping, on the client device, the defined period of time of the signal if the first moving average exceeds the second moving average at least the second period of time after the last time a part of the signal was skipped.

7. The method in claim 1, where the determining of the measurement of the minimum signal latency further comprises initializing the minimum signal latency as a current latency measured some configured time into the current session, thereafter for the duration of the session comparing a current value of the minimum signal latency to a current latency value, and setting the minimum signal latency value to the current latency value if the current latency value is less that the minimum signal latency value.

8. The method in claim 1, where the selected period of time corresponding to the length of the buffered signal is larger than the expected signal latency but smaller than the expected length of a session.

9. The method in claim 1, wherein buffering a part of the signal having a length corresponding to a selected period of time comprises buffering no less than 15 seconds and no more than 1 minute of the signal.

10. The method in claim 1, where the change in signal latency is calculated by comparing the latency measured at the first configured period of time prior to the most recent measurement.

11. The method in claim 1, where the first configured percentage is at least 50% and no more than 200%.

12. The method in claim 1, where the second configured percentage is at least 25% and no more than 100%.

13. The method in claim 1, wherein the third configured period of time is at least the length of time of the first period of time.

14. A method executing on hardware of a client device for maintaining the output quality of a media stream received and presented by the client device, the method comprising:
initializing a signal buffer on the client device to hold at least 30 seconds of a media signal at the start of a session;

measuring, on the client device, the latency of the signal processing relative to the realtime position in the signal buffer;

calculating, on the client device, the derivative of the latency over time;

calculating, on the client device, a first moving average of the latency over the first 30 second time period;

defining, on the client device, a first threshold associated with the first moving average, greater than the first moving average by some fixed percentage; and determining, on the client device, if the absolute value of the signal latency is above the first threshold, and if so commanding the device performing the signal processing to perform a series of skips of the signal over a first period until the derivative of the signal latency is no longer exceeds the first threshold.

15. The method in claim 14, further comprising:
calculating, on the client device, a second moving average of the derivative of the latency over the most recent 5 second time period;

calculating, on the client device, a third moving average of the derivative of the latency over the most recent 30 second time period; and determining, on the client device, if the second moving average exceeds the third moving average, and if so commanding the device performing the signal processing to perform a series of skips of the signal over a first period until the third moving average exceeds the second moving average.

16. The method in claim 15, further comprising:
defining, on the client device, a first value, associated with expected number of skips over a first period of time greater than the largest moving average but less than 10 minutes;

defining, on the client device, a second value associated with the first value, greater than the first value by some fixed percentage;

defining, on the client device, a third value associated with the first value, less than the first value by some fixed percentage;

determining, on the client device, if the number of skips over the last first period of time exceeds the second value, and if so command the device performing the signal processing to select a signal of lower quality if available, or stop playing otherwise; and determining, on the client device, if the number of skips over the last first period of time is less than the third value, and if so command the device performing the signal processing to select a signal of greater quality if available.

17. The method in claim 15, further comprising:
defining, on the client device, a fourth value associated with the maximum number of skips allowed over some period of time, between the first value and the second value;

defining, on the client device, a fifth value associated with the minimum number of skips allowed over some period of time, between the first value and the third value;

defining, on the client device, a sixth value associated with the initial time between signal skips;

determining, on the client device, if the number of skips over the last first period of time exceeds the fourth value, and if so command the device performing the signal processing to skip a larger portion of the signal over a period larger than the sixth value, both increased by a fixed percentage, until the number of skips over the last period of time is below the fourth value; and determining, on the client device, if the number of skips over the last first period of time is less than the fifth value, and if so command the device performing the signal processing to skip a smaller portion of the signal over a period less than the sixth value, both decreased by a fixed percentage, until the number of skips over the last period of time is above the fifth value.

18. The method in claim 15, further comprising:
determining, on the client device, if the derivative of the signal latency exceeds 150% of the first moving average, and if so commanding the device performing the signal processing to perform a series of skips of the signal over a first period until the derivative of the signal latency no longer exceeds 150% of the first moving average.

19. A computer readable medium having stored thereon instructions that, when executed by a computer, causes the computer to perform a method for maintaining the output quality of a media stream, the medium comprising:
programming instructions for initializing a signal buffer to hold at least 30 seconds of a media signal at the start of a session;
programming instructions for measuring the latency of the signal processing relative to the real-time position in the signal buffer;
programming instructions for calculating the derivative of the latency over time;
programming instructions for calculating a first moving average of the latency over the first 30 second time period;
programming instructions for defining a first threshold associated with the first moving average, greater than the first moving average by some fixed percentage; and
programming instructions for determining if the absolute value of the signal latency is above the first threshold, and if so commanding the device performing the signal processing to perform a series of skips of the signal over a first period until the derivative of the signal latency is no longer exceeds the first threshold.

20. The computer readable media in claim 19, further comprising:
programming instructions for calculating a second moving average of the derivative of the latency over the most recent 5 second time period;
programming instructions for calculating a third moving average of the derivative of the latency over the most recent 30 second time period; and
programming instructions for determining if the second moving average exceeds the third moving average, and if so commanding the device performing the signal processing to perform a series of skips of the signal over a first period until the third moving average exceeds the second moving average.

21. The computer readable media in claim 19, further comprising:
programming instructions for defining a first value, associated with expected number of skips over a first period of time greater than the largest moving average but less than 10 minutes;
programming instructions for defining a second value associated with the first value, greater than the first value by some fixed percentage;
programming instructions for defining a third value associated with the first value, less than the first value by some fixed percentage;
programming instructions for determining if the number of skips over the last first period of time exceeds the second value, and if so command the device performing the signal processing to select a signal of lower quality if available, or stop playing otherwise; and
programming instructions for determining if the number of skips over the last first period of time is less than the third value, and if so command the device performing the signal processing to select a signal of greater quality if available.

22. The computer readable media in claim 19, further comprising:
programming instructions for defining a fourth value associated with the maximum number of skips allowed over some period of time, between the first value and the second value;
programming instructions for defining a fifth value associated with the minimum number of skips allowed over some period of time, between the first value and the third value;
programming instructions for defining a sixth value associated with the initial time between signal skips;
programming instructions for determining if the number of skips over the last first period of time exceeds the fourth value, and if so command the device performing the signal processing to skip a larger portion of the signal over a period larger than the sixth value, both increased by a fixed percentage, until the number of skips over the last period of time is below the fourth value; and
programming instructions for determining if the number of skips over the last first period of time is less than the fifth value, and if so command the device performing the signal processing to skip a smaller portion of the signal over a period less than the sixth value, both decreased by a fixed percentage, until the number of skips over the last period of time is above the fifth value.

23. The computer readable media of claim 19, further comprising:
computer instructions for determining if the derivative of the signal latency exceeds 150% of the first moving average, and if so commanding the device performing the signal processing to perform a series of skips of the signal over a first period until the derivative of the signal latency no longer exceeds 150% of the first moving average.

* * * * *